_United States Patent_ [19]

Panzarino et al.

[11] 4,264,679

[45] Apr. 28, 1981

[54] DURABLE CERAMIC DECORATING ENAMELS BASED ON THERMALLY STABLE CADMIUM RED COLORS

[75] Inventors: Joseph N. Panzarino, Big Flats, N.Y.; Sylvester R. Sandor, Orlando, Fla.

[73] Assignee: Corning Glass Works, Corning, N.Y.

[21] Appl. No.: 870,426

[22] Filed: Jan. 18, 1978

[51] Int. Cl.$^3$ .................. B32B 17/06; C03C 5/00
[52] U.S. Cl. ............................ 428/427; 106/48; 106/49; 106/54; 428/428; 428/432
[58] Field of Search ............... 428/427, 432, 325, 914, 428/204, 207, 210; 427/193, 376 C, 218, 269; 106/39.6, 47 R, 48, 54, 49, 313; 156/89, 240

[56] References Cited

U.S. PATENT DOCUMENTS

| | | | |
|---|---|---|---|
| 2,466,849 | 4/1949 | Hood | 106/54 |
| 2,734,840 | 2/1956 | Kane | 156/89 |
| 3,857,746 | 12/1974 | Blanco et al. | 428/204 |
| 3,939,295 | 2/1976 | Robertson et al. | 427/376 C |
| 3,962,523 | 6/1976 | Robinson | 428/432 |
| 4,008,091 | 2/1977 | Wagner et al. | 106/48 |
| 4,043,824 | 8/1977 | Wagar | 428/325 |

_Primary Examiner_—Paul J. Thibodeau
_Attorney, Agent, or Firm_—Kees van der Sterre; Clinton S. Janes, Jr.

[57] ABSTRACT

Ceramic articles are provided with cadmium red-based decorations of improved chemical durability, by firing the decorations onto the articles at high temperatures. The cadium red-based enamels used for decoration are protected against color burn-out during high-temperature firing by a color stabilizing agent consisting of a fritted, sinterable, devitrification resistant alkali borosilicate glass which is combined with the enamels prior to firing.

6 Claims, No Drawings

DURABLE CERAMIC DECORATING ENAMELS BASED ON THERMALLY STABLE CADMIUM RED COLORS

BACKGROUND OF THE INVENTION

Cadmium red-based pigments, and enamels comprising those pigments in combination with pigment-supporting fluxes, are well known in the art. Cadmium red pigment is considered to be a mixed CdS/CdSe crystal, commonly referred to as cadmium sulfoselenide, wherein composition variations can provide red coloration within a considerable range of color.

As noted by C. W. Parmelee in *Ceramic Glazes*, p. 447, Third Edition, Cahners, Boston, Massachusetts, (1973), cadmium red pigments are unstable at temperatures above about cone 015–010, and provide dependable coloration only with short duration firing. Thin coloring layers are particularly sensitive to overheating, although coloring variations can be controlled somewhat through the use of thicker coloring layers.

The color of cadmium red pigments can be stabilized through the use of cadmium-containing fluxes. U.S. Pat. No. 3,857,746 to Blanco et al., for example, reports the use of a $CdO$—$PbO$—$B_2O_3$—$SiO_2$ flux in combination with a CdS/CdSe pigment to provide enamels for decals. Even where cadmium red enamels comprising cadmium-containing fluxes are used, however, the color stability of the resulting enamels during firing is relatively poor. Thus these colors have a strong tendency to turn gray at firing temperatures over about 800° C., with soak times in excess of about 10 minutes, so that relatively mild firing treatments must be used in the application of cadmium red decorations.

The combined use of cadmium-containing fluxes and relatively low firing temperatures produces a fired decoration with rather poor chemical durability. Specifically, the fired decoration has low resistance to attack by alkaline media such as the commonly used detergents.

It is a principal object of the present invention to provide cadmium red decoration systems using CdS/CdSe pigments exhibiting improved resistance to color burn-out at high temperatures.

It is a further object of the invention to provide ceramic articles decorated with cadmium red-based decorating enamels which exhibit improved chemical durability.

Other objects and advantages of the invention will become apparent from the following description thereof.

SUMMARY OF THE INVENTION

In accordance with the present invention, cadmium red-based enamelling compositions for ceramic decorating are provided which can be fired to high temperatures to improve the chemical durability of the decoration. The high-firing capability of these enamelling compositions is due to the presence in the enamel system of a fritted glass color stabilizing agent which inhibits color burn-out during firing, so that high firing temperatures and long soak times at those temperatures can be used.

In one aspect, the invention comprises a decorated ceramic article supporting a cadmium red-based decorating enamel of improved chemical durability. The decorating enamel comprises a conventional cadmium red pigment consisting essentially of cadmium sulfoselenide and a conventional enamel flux composed, for example, of a $CdO$—$PbO$—$B_2O_3$—$SiO_2$ glass.

The enamel is improved by the addition thereto of a color stabilizer consisting essentially of a sinterable, devitrification-resistant alkali borosilicate glass. The presence of this glass in the enamel during firing inhibits thermal color changes in the cadmium sulfoselenide pigment, permitting the firing of the enamel at temperatures, for example, in excess of 800° C. for soak times in excess of 10 minutes.

The firing of the enamel under these conditions produces a cadmium red-based decoration with good red-to-pink coloration and excellent chemical durability. The resistance of the decoration to alkaline attack, particularly attack by detergents, is greatly improved.

The invention further comprises a method of stabilizing a cadmium red-based ceramic decorating enamel against color burn-out during firing, which method comprises the step of combining the enamel with a color stabilizing agent prior to firing. The color stabilizing agent consists of a fritted, sinterable, devitrification resistant alkali borosilicate glass.

The fritted glass stabilizing agent may be combined with the components of the decorating enamel in several different ways. One of the most effective methods is to provide the stabilizing agent as a discrete layer on the ceramic article, depositing that layer over a previously applied layer of flux and pigment. Alternatively, the fritted stabilizer may be combined with the flux and pigment by dispersion in a flux-pigment mixture prior to the application of the enamel to the ceramic article.

The excellent thermal stability of cadmium red-based enamelling systems provided in accordance with the invention permits the use of high firing temperatures even when very thin layers of enamel are used. Hence, the stabilized decorating enamels may be utilized, for example, in thin decal systems for the decoration of ceramic articles, as well as applied directly to ceramic ware by the known slurry screening or direct printing techniques.

DETAILED DESCRIPTION

Ceramic articles which may be decorated with stabilized cadmium red enamels as above described include any of the prior art ceramics which have been decorated by enamelling techniques. Examples of such ceramics include the clay-based ceramics, the newer glass-ceramics, and even refractory glassware.

The proportions of pigment and enamel flux present in enamelling formulations to be stabilized according to the invention may vary over a broad range. For example, conventional enamels may comprise cadmium sulfoselenide pigment/enamel flux mixtures wherein the pigment content ranges from as little as about 2% to 20% or more by weight. Any of these conventional enamelling formulations may be stabilized as hereinabove described.

The flux component of enamelling formulations typically consists of a fusable fritted glass, often fritted lead borosilicate glass, which further includes cadmium oxide to improve the color stability of cadmium sulfoselenide pigments. Many additional oxide components may of course be present in such fluxes to improve enamel gloss or durability, or to modify fluxing behavior, particularly including the alkali metal oxides, the alkaline earth metal oxides, the oxides of trivalent metals such as Al, and the oxides of tetravalent metals such as Zr, Ti and Sn. The invention is not limited to the use of any particular flux; any of the enamel fluxes utilized in the prior art may be present.

As previously noted, the color stabilizing agent of the invention consists essentially of a fritted, fusable, devitrification-resistant alkali borosilicate glass. Glasses of this type are well known, one useful family being described in U.S. Pat. No. 2,466,849 to H. P. Hood. Such glasses have compositions comprising about 60–83% $SiO_2$, 1–21% $R_2O$, wherein R is $K^+$ or $Na^+$, 8–39% $B_2O_3$, and 0–6% $Al_2O_3$, the ratio $R_2O/B_2O_3$ being less than about 1.1. Additional oxide components may be present in the stabilizing glass, provided that they do not deleteriously affect the color stabilizing characteristics of the composition.

The method of preparing the stabilizing frit is not critical to the invention. Conventional glass melting and fritting techniques may be used to provide powdered glass suitable for dispersion in an enamel, or for deposition over an enamel layer as a suspension to provide a covering stabilizing layer. Vehicle or binder formulations useful for applying layers of stabilized enamel or covering layers of stabilizing agent are well known to those skilled in the art.

When the color stabilizer is applied as a covering layer, the thickness of the covering layer is not critical and may for example be of the same order of thickness as the underlying enamel layer. Layers as thin as 2–4 microns have provided a useful color stabilizing effect.

When the stabilizer is to be dispersed within the enamelling system and applied with the enamel to a ceramic article, best results are obtained by controlling the ratio of stabilizer to flux and pigment. Additions sufficient to provide a concentration of about 5–25% of stabilizer by weight in the enamel, with flux and pigment components making up the remaining 75–95% of the enamelling system, are quite suitable. Generally, low stabilizer concentrations can be used for short-duration enamel firing treatments near 800° C., while higher temperatures and/or longer soak times require higher stabilizer concentrations.

Preferred methods for stabilizing cadmium red enamels and using the stabilized enamels for the decoration of ceramic articles are described in the following detailed examples.

EXAMPLE I

A cadmium red decorating enamel is compounded by intermixing 100 grams of a conventional fritted $CdO-PbO-B_2O_3-SiO_2$ glass enamel flux, 3 grams of a cadmium sulfoselenide pigment, and 40 grams of a conventional organic vehicle. To this formulation is added 30 grams of a fritted glass color stabilizing agent consisting of a potassium borosilicate glass having a composition of about 79.2% $SiO_2$, 18.4% $B_2O_3$, and 2.4% $K_2O$. The fritted glass has an average particle size of about 4 microns.

The above components are mixed in an ink mill to provide an enamel suspension in the form of a silk-screening paste. This paste is then applied to decal backing paper using a 280-mesh silk screen to form a paste layer thick enough to provide an enamel layer about 3–5 microns thick after firing.

A non-pigmented covering layer consisting of a fritted glass having the same composition as the glass enamel flux above described is then provided on the enamel. This layer is also deposited by silk screening using a paste suspension of the glass and a 280-mesh silk screen, and is thick enough to produce a fired layer about 3–5 microns thick.

A protective lacquer film is applied over the enamel layers and dried. The resulting decal is then used to transfer the enamel and protective layers to a glass-ceramic plate.

The plate and transferred decal layers are fired to a temperature above 800° C., held at that temperature for 15–20 minutes, and finally cooled to room temperature. The pigment color of the enamel is not significantly affected by this firing. Moreover, the detergent durability of the resulting red decoration is excellent, and the decoration exhibits low-toxic metal release.

In contrast to the behavior of this decorating enamel, a red decoration provided using an unstabilized cadmium red enamelling composition such as used in the prior art exhibits relatively poor color stability during high temperature firing. Hence, a decal provided as above described, but from which the 30 grams of potassium borosilicate color stabilizing agent is omitted, ordinarily provides a decoration which is gray in color after firing at temperatures above 800° C. for 15–20 minutes.

EXAMPLE II

A cadmium red decorating enamel is compounded by intermixing 100 grams of a conventional fritted $CdO-PbO-B_2O_3-SiO_2$ glass enamel flux, 3 grams of cadmium sulfoselenide pigment, and about 30 grams of a conventional organic vehicle. This mixture is blended in an ink mill to provide a screening paste, and this paste is applied to decal backing paper with a 280-mesh silk screen in a quantity sufficient to provide an enamel layer about 3–5 microns in thickness after firing.

About 100 grams of the fritted potassium borosilicate glass color stabilizing agent described in Example I is mixed with 30 grams of a conventional organic vehicle to provide a second screening paste. A layer of this paste is then applied with a 280-mesh silk screen over the enamel layer on the decal backing paper in a quantity sufficient to provide a covering layer of glass color stabilizing agent about 3–5 microns in thickness after firing.

A non-pigmented covering layer consisting of a screening paste containing the $CdO-PbO-B_2O_3-SiO_2$ enamel flux glass is applied over the stabilizing covering layer in an amount sufficient to provide a flux layer about 3–5 microns in thickness after firing. A final layer consisting of a protective lacquer film is then applied over the enamel and covering layers of the decal.

The decal layers are then transferred from the decal backing to the surface of a ceramic article, the article is fired to a temperature in excess of 800° C. for a soak time of 15–20 minutes, and thereafter cooled to room temperature. The color of the cadmium sulfoselenide pigment is not deleteriously affected by this firing treatment, and the detergent durability of the resulting red decoration is excellent. The decoration also exhibits extremely low toxic metal release. The use of a discrete layer of color stabilizing agent as herein described provides superior color stabilizing characteristics, and thus constitutes a preferred embodiment of the invention.

Of course the foregoing examples are merely illustrative of methods by which the glass color stabilizing agents of the invention may be incorporated into conventional cadmium red enameling systems. Obviously numerous other methods for combining these agents with cadmium sulfoselenide pigments may be utilized, and the resulting stabilized pigments may then be used for the decoration of ceramic articles in accordance with any of the conventional and well known silk screening, direct printing or decal transferring techniques used in the art.

We claim:

1. In a decorating enamel suitable for providing a fired decoration on a ceramic article consisting of, in combination, a cadmium red pigment consisting essentially of CdS/CdSe; and an enamel flux consisting essentially of a $CdO-PbO-B_2O_3-SiO_2$ glass;

the improvement comprising the addition to the enamel of a color stabilizing agent consisting of a sinterable devitrification-resistant alkali borosilicate glass in glass frit form.

2. A decorating enamel in accordance with claim 1 wherein the color stabilizing agent is provided as a discrete layer of glass frit covering the pigment and enamel flux.

3. A decorating enamel in accordance with claim 1 wherein the color stabilizing agent is dispersed as a glass frit throughout the combined pigment and enamel flux.

4. A method of improving the stability of a CdS/CdSe-based ceramic decorating enamel against color burn-out during firing, said decorating enamel consisting of a cadmium red pigment consisting essentially of CdS/CdSe and an enamel flux consisting essentially of a $CdO-PbO-B_2O_3-SiO_2$ glass, which method comprises the step of combining the enamel prior to firing with a color stabilizing agent consisting of sinterable, devitrification resistant alkali borosilicate glass in glass frit form.

5. A method in accordance with claim 4 wherein the color stabilizing agent is provided as a discrete layer of glass frit covering the enamel.

6. A method in accordance with claim 4 wherein the color stabilizing agent is dispersed as a glass frit within the enamel.

* * * * *